UNITED STATES PATENT OFFICE.

ALFRED A. WELLS, OF MONTCLAIR, NEW JERSEY, ASSIGNOR TO NATIONAL CARBON COMPANY, INC., OF NEW YORK, N. Y., A CORPORATION OF NEW YORK.

PRODUCING MANGANESE-CONTAINING BODIES.

1,359,640.  Specification of Letters Patent.  Patented Nov. 23, 1920.

No Drawing.  Application filed June 29, 1918. Serial No. 242,579.

*To all whom it may concern:*

Be it known that I, ALFRED A. WELLS, a citizen of the United States, and a resident of Montclair, in the county of Essex and State of New Jersey, have invented certain new and useful Improvements in Producing Manganese-Containing Bodies, of which the following is a specification.

This invention relates to the production of manganese salts from spent depolarizing agents, especially the manganese dioxid depolarizer of worn out dry batteries of the Leclanché type and the process embraces the production of manganese compounds containing chlorid of manganese.

It frequently happens that the depolarizer in a dry battery is very largely in an unchanged condition, the deterioration of the battery being due to the presence of an insoluble compound of zinc which forms in and around the paper lining employed in dry batteries of the large or standard type and in and around the cloth bag frequently employed in cells of the miniature type. The zinc compound is evidently produced by the action of ammonia on zinc chlorid present with electrolyte, and may be some sort of a basic compound of zinc chlorid, or perhaps an ammonia addition product. Usually this compound is found in greatest amount just within the paper lining in the outer layers of the depolarizing agent forming a cement which causes the outer layers of depolarizer to adhere firmly to the paper when the spent battery is taken apart. The formation of the insoluble compound in this manner prevents the ready passage of the electric current hence the voltage and amperage of the cell drops to a negligible quantity and the cell is discarded.

In such cells the amount of depolarizing material actually "consumed" (reduced to a lower oxid in reacting with hydrogen) may amount to perhaps only ten or fifteen per cent. The battery mix may be removed from the spent batteries, washed with water and dried, thus removing the zinc chlorid, ammonium chlorid, and any other soluble salts which may be present. Usually little or no manganese salts go into solution. The mix, after washing with water, may be used in making new batteries, but it is usually preferable to supplement the water-extraction by an extraction with very dilute hydrochloric acid. The ammonium and zinc compounds extracted by water may be concentrated for use in preparing fresh electrolyte. The insoluble zinc compounds above referred to will be dissolved by the dilute hydrochloric acid and the solution so obtained may be worked for its values.

When extraction with very dilute hydrochloric acid is employed, the insoluble residue consists essentially of a mixture of graphite and manganese dioxid with lower oxids of manganese. This mixture may be used without further treatment in making up fresh cells, or it may be treated by the method hereafter described to utilize its manganese content.

In case the manganese is to be again worked up into a depolarizing agent for dry batteries, it is desirable to remove iron as far as possible, as the presence of the latter is liable to bring about local action and deterioration upon standing.

One part of this depolarizing material may be mixed with two parts of powdered sodium acid sulfate or bisulfate of soda and the mixture heated until the mass frits, when the product is broken up, powdered, and extracted with hot water. The solution of manganese sulfate obtained contains various impurities, particularly iron. A small amount of sodium carbonate is added which throws down the major portion of the iron or similar impurities. The solution is boiled for a short time and filtered and the iron thus eliminated. The manganese in the filtrate may be precipitated with sodium carbonate, washed and dried, giving the carbonate of manganese.

In the preferred form of the invention the depolarizer taken from worn out dry cells is washed with water, dried as indicated above and then digested with hydrochloric acid and filtered. In this way the graphite is recovered in the insoluble residue. The filtrate is preferably boiled for a short time to remove chlorin and some of the excess hydrochloric acid and may then be diluted considerably. A proportion of the solution is then taken out, and a solution of sodium carbonate added thereto to precipitate manganese and iron. The precipitate, if desired, may be washed with hot water and it is then returned to the bulk of the solution and the latter boiled for a time. The iron compound in solution and the manganese in the form of carbonate exchange places, carbon dioxid being given off and the iron being precipitated as the hydrate. The solution obtained is practically free from iron. This is filtered, the filtrate evaporated and manganese chlorid crystallized out.

In my co-pending application Serial No. 198,865, filed October 27, 1917, I have described the production of manganese salts particularly sulfates and I do not lay claim herein to the production of manganese compounds other than those containing chlorids.

What I claim is:

1. The process of making manganese chlorid from spent dry battery mix, which comprises treating the spent mix with hydrochloric acid to dissolve the manganese compounds, filtering off the carbonaceous constituent of the mix, boiling off chlorin and excess acid from the solution, digesting the solution with freshly precipitated manganese carbonate to precipitate iron, and filtering off the iron precipitate.

2. The process of making manganese chlorid from spent dry battery mix, which comprises treating the spent mix with hydrochloric acid to dissolve the manganese compounds, filtering off the carbonaceous constituent of the mix, boiling off chlorin and excess acid from the solution, dividing the solution, precipitating the iron and manganese from one portion with a soluble carbonate, filtering off the precipitate, digesting the other portion of the solution with said precipitate to precipitate iron, and filtering off the iron precipitate.

In testimony whereof, I have affixed my signature to this specification.

ALFRED A. WELLS.